July 21, 1931.   J. B. ROBERTSON ET AL   1,815,586
PROCESS OF MAKING RUGS
Filed March 5, 1928   5 Sheets-Sheet 1

INVENTOR
JAMES BAXTER ROBERTSON
GEORGE ROBERTSON
BY
ATTORNEY

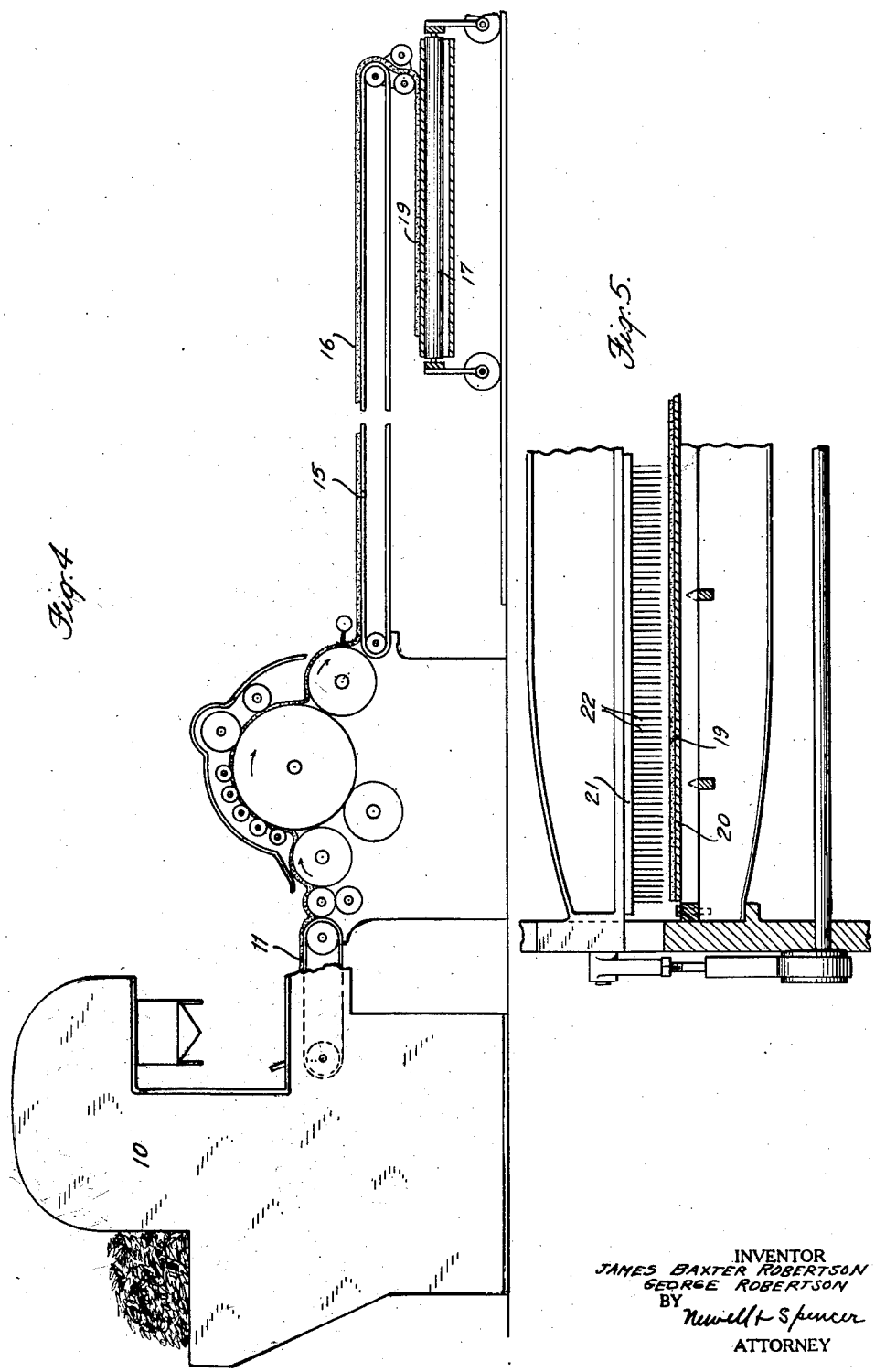

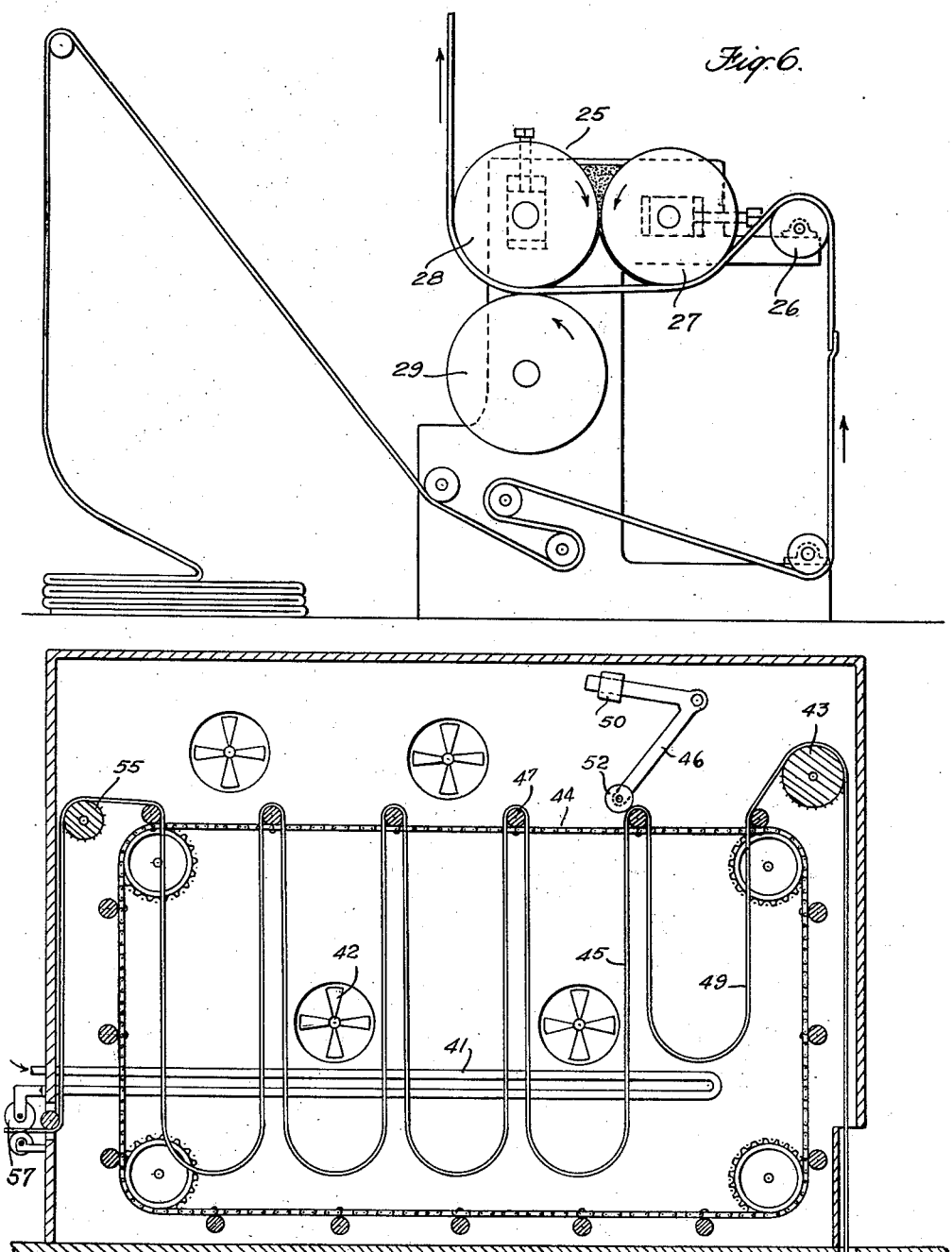

July 21, 1931.  J. B. ROBERTSON ET AL  1,815,586
PROCESS OF MAKING RUGS
Filed March 5, 1928  5 Sheets-Sheet 4
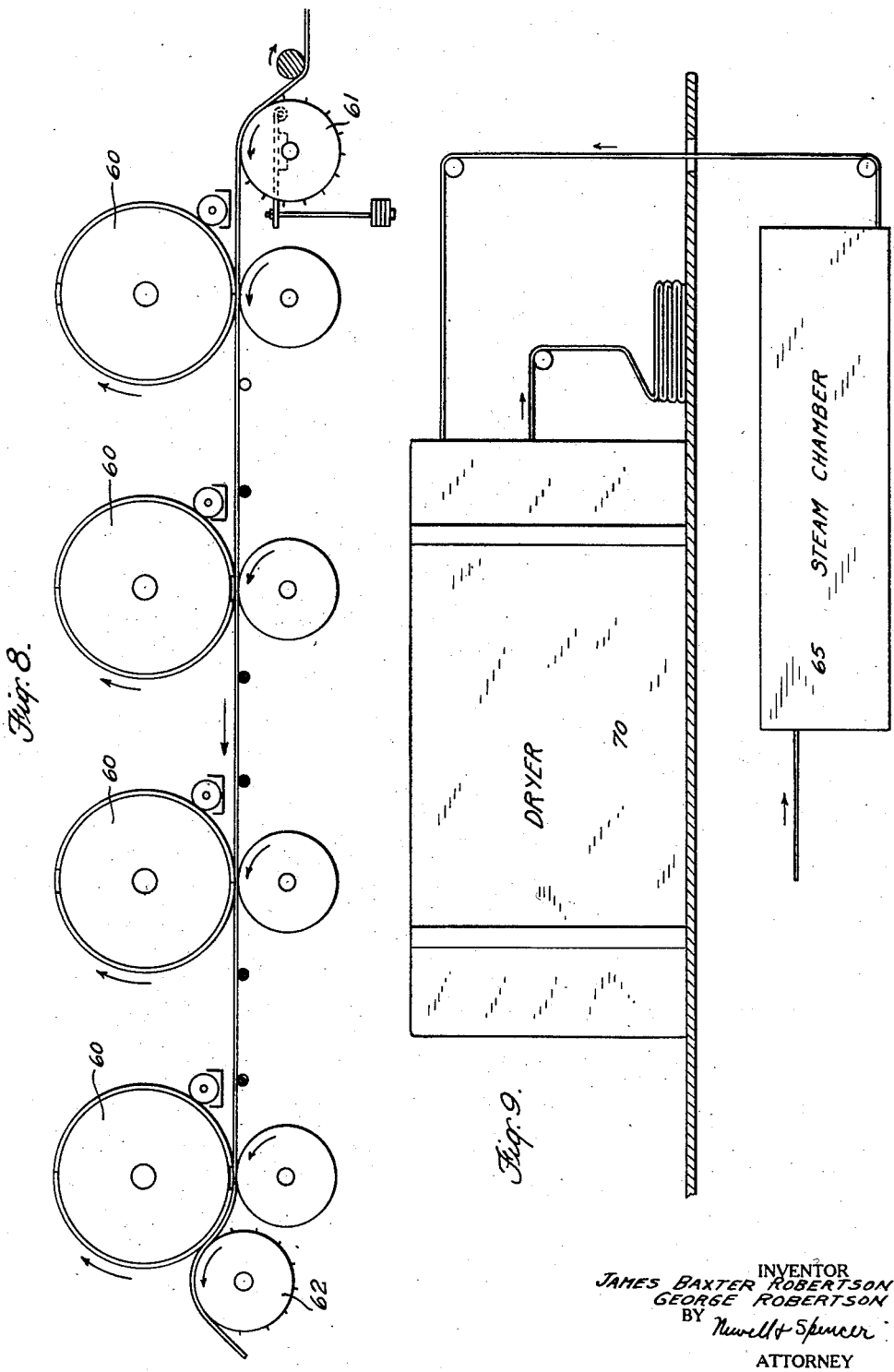
INVENTOR
JAMES BAXTER ROBERTSON
GEORGE ROBERTSON
BY
ATTORNEY

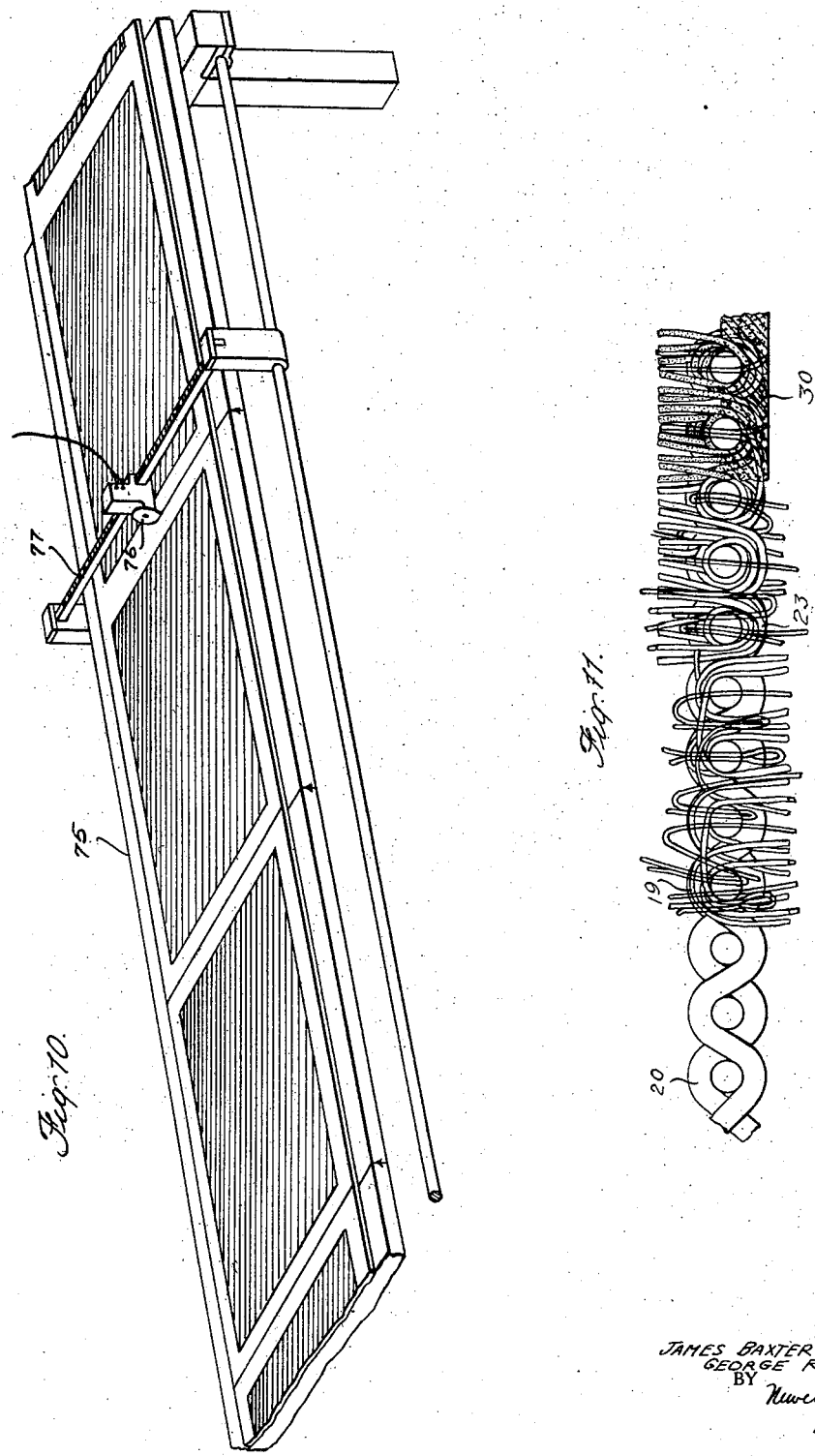

Patented July 21, 1931

1,815,586

UNITED STATES PATENT OFFICE

JAMES BAXTER ROBERTSON, OF PATERSON, AND GEORGE ROBERTSON, OF RIDGEWOOD, NEW JERSEY, ASSIGNORS TO THE PARATEX CORPORATION, OF PATERSON, NEW JERSEY, A CORPORATION OF NEW JERSEY

PROCESS OF MAKING RUGS

Application filed March 5, 1928. Serial No. 259,122.

This invention relates to methods of making floor coverings such as rugs and particularly to a process of making rugs simply and rapidly and at a comparatively small cost.

One of the objects of the present invention is to produce a rug which is durable and which will have the general appearance of ordinary rugs such as are woven.

Another object of the invention is to provide a cheap and rapid method of making rugs which may be sold at a low price.

One feature of the present invention resides in blotching a material upon one face of the rug making material and printing a rug design upon the face of the rug over the blotching material.

Another feature of the invention resides in forcing a plastic backing material into one side of the rug-forming material and printing rug designs upon the opposite face of the rug.

A further feature of the invention resides in treating material to produce a rug and cutting the rug out of the rug material.

Other features of the invention reside in the novel process steps and combinations thereof to be hereinafter set forth.

The figures of the drawings disclose a flow sheet and apparatus typical of those which may be used in carrying out the present invention.

In the drawings—

Figure 4 is a side elevation of a feeder, garnetting machine and bat-forming device, such as may be employed in the making of rugs in accordance with the present invention;

Figure 5 is a vertical sectional view of one type of needling machine which may be employed in the present invention;

Figure 6 is a vertical sectional view of a machine for applying the blotching material and backing to the rug-making material;

Figure 7 is a diagrammatic view of drying apparatus which may be employed in connection with the apparatus shown in Figure 6 for drying or curing the blotching material and backing applied on the rug-making material;

Figure 8 is a diagrammatic view of a preferred type of printing apparatus for applying the rug design to the rug-making material;

Figure 9 is a diagrammatic representation of the steam chamber and drier used in fixing the dye to the rug-making material;

Figure 10 is a perspective view of a cutting machine for cutting the web of rug-making material into lengths to form the separate rugs; and Figure 11 is a sectional view of a rug made in accordance with the present invention.

Figure 1:
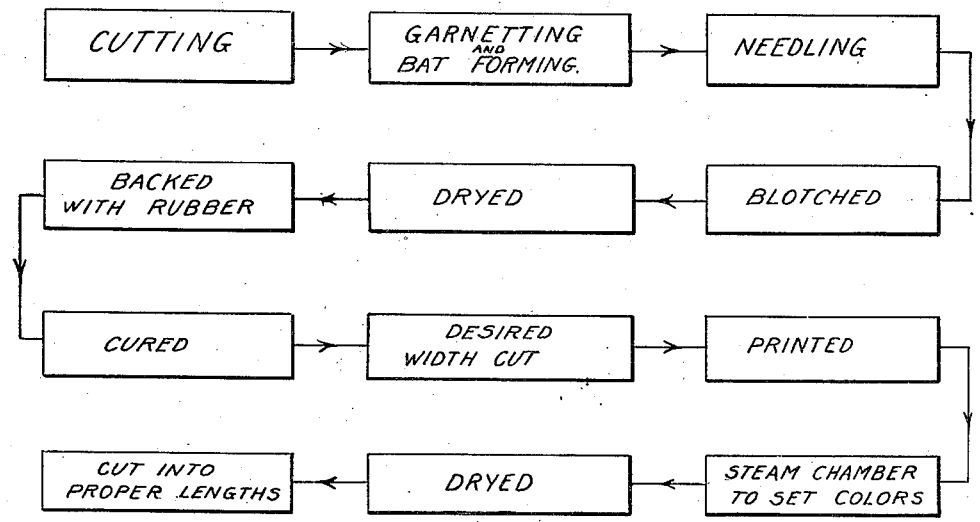
Figure 1 is a flow sheet setting forth the various steps of a rug-making operation.

The flow sheet shown in Figure 1 sets forth the process steps in a preferred sequence as follows: The rug may be made by chopping hemp, jute, wool fiber or other suitable material, which is to form the nap of the rug into the desired length, for example, three inches. The fibrous material then may be passed through a feeder and garnetting machine to tear the fibers apart and produce the proper shredded character in the material to form the nap of the rug. This shredded fiber is formed into bats of the desired width and thickness and wound upon rolls, in which form the material may be stored to be used in other steps of the operation. A sheet of base-forming material such as burlap or other textile fabric, of a width exceeding that of the rug which is to be made, is passed continuously through a needling machine and a bat of the fibrous material which is to form the nap of the rug is laid over the burlap base material and forced through this material to produce a nap of fiber on one face of the base-forming material. It is usually desirable to apply a second bat of fibrous material to the needled burlap in order to produce a nap of the proper thickness for the rug and for this purpose the needled material is turned over and a second bat of fiber laid upon the side of the material which was not needled and the fibers forced back through the material in the opposite direction.

In a preferred form of the invention the sheet of rug-making material is then passed throuh a blotching machine by means of which a blotching material is applied to one face of the rug-making material. This blotching material gives weight or body to the rug and preferably is mixed with a dye or coloring matter to form a background color which is uniform throughout the rug. The blotched rug-making material is then dried and passed through a similar machine and a suitable backing material applied to the opposite face of the rug and forced into contact with the fibers and the textile base to securely hold the fibers in place in the rug. After each of the steps of blotching and backing the rug-making material may be passed through a drier which removes moisture and fixes or cures the material onto the rug.

The web of rug-making material is then cut to the desired width and passed to a printing machine which applies the rug design to the blotched face of the rug-making material over the background color. The sheet of material is passed from the printing machine through a steam chamber which fixes the dye applied to the fibers of the rug to give it a permanent color effect. The rug-making material is then passed through a drier and afterwards cut into the desired lengths between the ends of the rug design applied by the printing machine.

Although it is preferable to employ each of these process steps in the order given it should be clearly understood that the steps of the process may be modified or altered and in some instances steps of the process may be omitted altogether without departing from our invention.

The invention or any of its process steps may be carried out in any suitable types of machinery but will be described by way of illustration as carried out in machinery of preferred forms.

Figure 2:
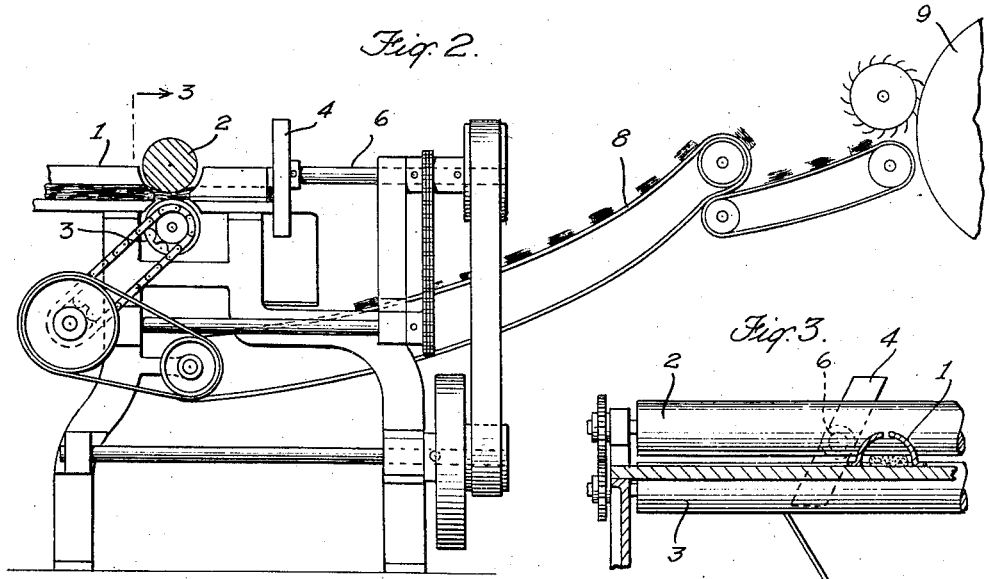
Figure 2 is an end elevation of one form of cutting machine for cutting material to form the nap of the rug into the desired lengths.
Figure 3:
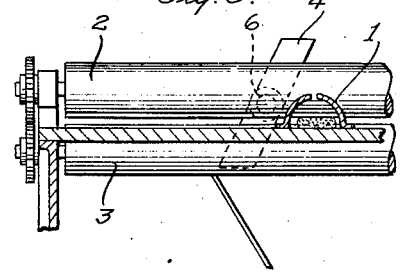
Figure 3 is a front view of the machine shown in Figure 2.

The material which is to form the nap of the rug may be cut into the desired lengths by any suitable mechanism or by hand and in some instances where the fiber is short, the step of cutting the material into short lengths may not be necessary. As illustrated in Figures 2 and 3, the material to be cut into lengths is fed into a guideway 1 from which it passes between rollers 2 and 3, the adjacent portions of which rotate toward the knife 4 to feed the material at a definite rate into position to be cut. The knife 4 consists of a bar fixed at its center to the shaft 6 and having a cutting edge on each end which cooperates with the stationary plate 5 to cut the material into the desired lengths. The rollers 2 and 3 are preferably from the same source of power which operates the rotating knife 4 and rotate at such a speed that the material being fed through the guideway 1 will be moved approximately 3 inches forward between every half rotation of a shaft 6 upon which the knife blade 4 is mounted. In this way the oppositely-extending knife blades will chop the fibrous material into equal lengths. The cut material falls to a traveling belt or apron 8, which also may be driven from the same source of power and delivers the fibrous material from the cutter to a cone duster 9 or other device for effecting a preliminary shredding of the material.

The material which is delivered from the cone duster is taken to a feeder 10 shown in Figure 4, which delivers the material to the apron 11 at a substantially constant rate. The fibrous material so delivered is passed to a garnetting machine in which the fiber is torn into fine shreds and delivered in a condition suitable for applying the fiber to the base-forming material to form the nap of the rug. When light fibers, such as wool, are to be employed as a nap, it is usually desirable to pass the fiber through two successive garnetting machines in order that they may be torn apart to the desired extent.

The material delivered from the garnetting machine is laid upon an apron 15 in the form of a light bat 16 of substantially uniform thickness and delivers the fiber to a blamire 17 which reciprocates beneath the apron 15 to cause the bat to be doubled back and forth upon itself until it is of the desired thickness. One form of blamire suitable for this purpose is shown and described in the applicants' copending application, Serial No. 243,798, filed December 31, 1927. The bat 19 of material so produced is wound upon rollers for storage and for convenience in applying the bat to the sheet of burlap or other material which is to form the base for the rug.

The base material is in the form of a sheet 20 having a width exceeding that of the rug to be made. In the case of a rug which is to be 108 inches in width, the burlap will ordinarily be about 114 inches wide. The bat 19 of fibrous material to be applied to the rug is of approximately the same width as the base material and is unrolled upon the continuously moving sheet of burlap as it is passed through the needling machine.

The needling machine shown in Figure 5 may be of the type shown and described in the applicants' copending application Serial No. 243,799, filed December 31, 1927, and preferably consists of a reciprocating frame 21 carrying a large number of needles 22 having downwardly-extending barbs which engage with the fibers of the bat 19 of material which is to form the nap of the rug and force the material through the sheet of burlap 20 so as to produce a nap of the fibers upon the opposite face of the burlap. These sheets of rug-making material are ordinarily about 100 yards in length and may be secured together at their ends so that the operation may be carried on continuously, passing from one length of material to the next without interruption. In order to produce a better nap on the rug, the sheet of needled material is turned over and a second bat 23 of fibrous material applied to the opposite face of the needled burlap. The result of this second needling operation, as shown in Figure 11, is to force the fibers through the rug so that the ends of the fibers which projected from the face of the rug needled in the first operation are turned back upon themselves and add to the nap formed from the bat 23 of fibers applied to the opposite face of the rug. One face of the rug thus consists largely of loops of the fiber to which the backing material is applied to hold the fibers in place.

The sheet of rug-making material is then passed to the blotching machine 25 shown in Figure 6, where it passes over the roller 26 and beneath the rollers 27 and 28.

A pressure roller 29 forces the rug-making material into contact with the lower face of the roller 28 so as to press the blotching material into the base of the rug and into contact with each of the fibers on the upper face of the material. The blotching material is supplied to the rollers 27 and 28 on their upper face and in the trough formed between these rollers as they rotate. The rollers 27 and 28 are spaced from each other by a distance suitable to permit the proper amount of blotching material to flow between the rollers and be applied to the fibers of the rug. When the rollers 27 and 28 are separated by a distance of about .020 inches very satisfactory results are obtained. The rollers 27 and 28 preferably rotate in the same direction but it may be desirable in some instances to rotate the roller 27 in a direction opposite that of roller 28. The pressure roller 29 forces the blotching material into the burlap or base-forming material so that when it has dried it will seal the face of the rug to a large degree and prevent the liquid backing material 30 from penetrating to the printed face of the rug and discoloring the fibers. The blotching material being applied to the fibers of the rug preferably consists of a gum mixture to which coloring material is added. The gum mixture gives weight or body to the rug. In some cases the base color may be applied by the printing machine and only the gum mixture applied by the blotching machine. The rug-making material is passed from the blotching machine to a suitable drier, one form of which will be described later.

After the rug-making material has had the blotching and base color applied to one face of the rug by means of the blotching machine described and after the rug has been suitably dried the sheet of material is passed through a second machine similar to the blotching machine 25 shown in Figure 6 for applying a backing material to the opposite side of the rug-making material to lock the fibers of the rug into the sheet of burlap or base material in such a manner that they cannot be loosened or removed in use. This backing material may be of any suitable character, but is preferably a dispersion of rubber in water to which a few percent of a spreading material such as gum tragacanth has been added to increase the flowing qualities of the mixture and having a consistency such that the backing material contain approximately 53% of solids.

The backing material so produced is liquid and is poured into the trough between the rollers 27 and 28 and applied to the rug-making material in a manner similar to that in which the blotching material is applied to the opposite face of the rug. However, when the backing material is being applied the roller 27 is rotated in a direction opposite to that in which the roller 28 is rotated. In this way the lower face of the roller 27 is caused to move in a direction opposite to that in which the rug-making material is moved. The effect of this opposite rotation of the roller 27 is to smear the backing material over the face of the rug and to assist in effecting an even application of the backing material to the rug-making material. A pressure roller 29 similar to that employed in the blotching machine is used to force the rug-making material against the under surface of the roller 28 in order that the mixture will thoroughly coat the fibers and penetrate at least part way into the base material so that the fibers will adhere to each other and to the material forming the base of the rug. In this manner the backing material impregnates rather than coats the back of the rug so that the fibers are securely held in place but the presence of the blotching material applied to the opposite face of the textile effectively prevents the backing material from penetrating to the opposite face of the rug and discoloring the fibers. The sheet of rug-making material is then passed to a drier which removes the moisture from the backing material and dries or cures this material so as to effectively seal the fibers into the burlap.

The form of drier shown in Figure 7 may be used after the blotching and backing operations and consists of a housing 40 within which are located heating pipes 41 and blowers 42 for passing air rapidly through the drier to carry off the moisture evaporated from the material to be dried. The temperature of the chamber is preferably maintained in the neighborhood of 212° F. The material passing from the blotching machine or backing machine is drawn into the drier by means of a hackle roller 43 which engages the material on the opposite face from that to which the material to be dried has been applied. A chain 44 carrying rods or pipes 47, 48, etc. upon which the material to be dried is hung in festoons or loops passes upwardly beneath the hackle roller and forward across the upper portion of the drying chamber. The material to be dried is fed into the chamber by the hackle roller 43 and falls in the form of a loop between the successive pipes carried by the chain as at 45. The material is prevented from slipping and formed into loops of equal length by means of a trip 46 which engages the material on each pipe in turn to hold the adjacent loops in place until the loop being formed is of the proper length. This is effected by causing the trip 46 to engage the material on the pipe 47 until the loop 49 being formed is the same length as the loop 45 previously formed. The pipe 47 is moved forward continuously by the chain 44 and the engaging portion of the trip is positioned so that as it releases the loop formed on one pipe it engages the material on the next succeeding pipe to start the formation of the next loop. The trip 46 preferably consists of rollers 52 positioned at the opposite edges of the material to contact with that portion of the material which is later to be trimmed from the edges of the sheet. Since the holding member or trip must not engage that portion of the material which is later to become part of the rug, it is necessary to hold the trip in engagement with the material by a weight 50 which will be sufficiently heavy to prevent the material from slipping between its edges. The trip may conveniently be carried by a pivoted rod 51 to which the trip rollers 52 and the weight 50 are secured. The festoons of materials so formed are carried slowly through the drier and in the present instance are kept within the drier for 62 minutes, although a longer or shorter time may be used. At the opposite end of the drier a hackle roller 55 removes the material from the festooning device at a rate equal to that in which it is introduced into the drier by the hackle roller 43. The material is then passed out of an opening in the lower portion of the drier and if the material being dried has had both the blotching material and the backing material applied the edges of the rug are trimmed off by a rotary knife 57 or other device to reduce the material to the desired width.

The material which has been so prepared is then passed to a printing machine such as that shown in Figure 8, and shown and described in more detail in the applicants' copending application, Serial No. 247,840, filed January 19, 1928, by means of which the design of the rug is printed over the base color on the face of the web of material and if no base color was applied by the blotching machine this may also be applied by the printing machine. This printing machine consists of a series of printing rollers 60 positioned with their printing surfaces in a horizontal plane. A hackle roller 61 engages the rug-making material for applying a definite tension to the material being printed, and a hackle 62 applies an equal tension to the material as it is drawn from the rug-printing machine.

After the rug design has been applied to the nap of the material the rug is passed into the steam chamber 65 shown in Figure 9 for fixing the dye to the fiber of the rug. This steam chamber may contain a festooning device such as that employed in the drier previously described or the material may be passed through the drier in any other suitable manner. The web of material passing from the steam chamber enters a drier 70 which thoroughly dries the rug and from which it may be delivered to a cutting board 75 shown in Figure 10 for cutting the separate rugs apart. Any suitable means may be employed for this purpose such as a motor-driven rotary blade 76, which may operate in a guideway 77 for accurately cutting the rugs apart.

In making rugs having a background of the natural color of the fiber of the rug it may be desirable to omit the step of applying the base color to the rug. Similarly if a plain rug is to be produced the step of printing a design upon the blotched rug may be omitted, together with the steaming and drying of the rug attendant to the printing of the design upon the rug.

While preferred types of machinery for carrying out the process have been illustrated and described it is to be understood that the invention is not limited to its use as carried out by the specific mechanism shown but each of the process steps may be carried out in other forms or types of machinery and certain of the steps of the process may be modified or carried out in a different sequence without departing from the spirit and scope of the invention as defined by the claims.

What is claimed as new is:

1. The method of treating a pile fabric, the pile of which is made by needling fibrous material through a base fabric, which comprises applying to the face of said pile fabric a blotching material adapted to prevent the impregnation into said face pile of an anchoring material applied to the other side, and thereafter coating the other side with a material adapted to anchor said needled fibres to the base fabric, by applying thereto a liquid adapted to effect penetration of the anchoring material into said fabric and to leave a coating of said anchoring material surrounding the fibers and anchoring them to the base fabric.

2. The method as defined in claim 1, in which the face pile is colored by a dye incorporated in the blotching liquid.

3. The method of treating a pile fabric, the pile of which is made by needling fibrous material through a base fabric which comprises applying to the face of said pile fabric a blotching material adapted to prevent impregnation into the face pile of a rubber-containing liquid applied to the other side, working said blotching material through the face pile down to base fabric so as to seal the face of said base fabric against said rubber-containing liquid, drying the blotching material thus applied, and thereafter applying to the back of the base fabric a rubber-containing liquid adapted to effect penetration of the rubber into the base fabric and around the fibers needled therethrough.

4. The method of making printed rugs which comprises forming a pile fabric by needling fibrous material through a base fabric, coating the face pile and sealing the face of the base fabric with a blotching material, thereafter impregnating the back of the rug with a flexible material adapted to anchor said needled fibers to the base fabric, and thereafter printing a design upon the rug.

5. The method as defined in claim 4, in which the blotching material contains a dye adapted to give to the pile a base color, and the material is treated to fix the colored blotching material before the anchoring and printing operations.

6. The method of making a rug which comprises cutting hemp fibers to the desired length, forming the fibers into a bat, applying the bat of fibers to a sheet of textile fabric and needling the same therethrough, applying a colored blotching material to one face of the needled textile, fixing the blotching material to the fabric and fibers by heating, forcing a plastic material into contact with the fabric and fibers on the opposite face of the needled material, heating the same to cure the plastic material and printing individual rug designs on the needled material over the colored blotching material.

Signed at Paterson, New Jersey, this 2nd day of March, 1927.

JAMES B. ROBERTSON.
GEORGE ROBERTSON.